US011811083B2

(12) United States Patent
Chen et al.

(10) Patent No.: US 11,811,083 B2
(45) Date of Patent: Nov. 7, 2023

(54) BATTERY MODULE, BATTERY PACK AND VEHICLE

(71) Applicant: CONTEMPORARY AMPEREX TECHNOLOGY CO., LIMITED, Fujian (CN)

(72) Inventors: Sien Chen, Fujian (CN); Shoujiang Xu, Fujian (CN); Xiaoshan Dai, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 91 days.

(21) Appl. No.: 17/556,030

(22) Filed: Dec. 20, 2021

(65) Prior Publication Data

US 2022/0115730 A1    Apr. 14, 2022

Related U.S. Application Data

(63) Continuation of application No. PCT/CN2020/104676, filed on Jul. 25, 2020.

(30) Foreign Application Priority Data

Sep. 20, 2019   (CN) .......................... 201921576322.5

(51) Int. Cl.
*H01M 50/264* (2021.01)
*H01M 50/289* (2021.01)
*H01M 50/209* (2021.01)

(52) U.S. Cl.
CPC ....... *H01M 50/264* (2021.01); *H01M 50/209* (2021.01); *H01M 50/289* (2021.01); *H01M 2220/20* (2013.01)

(58) Field of Classification Search
CPC ............. H01M 50/264; H01M 50/209; H01M 50/289; H01M 2220/20; H01M 50/242; Y02E 60/10
See application file for complete search history.

(56) References Cited

U.S. PATENT DOCUMENTS

2014/0199574 A1*   7/2014   Fink ................... H01M 50/264
                                                                 429/99
2015/0194649 A1    7/2015   Ledbetter et al.

FOREIGN PATENT DOCUMENTS

CN       203165971 U       8/2013
CN       103296233 A       9/2013
(Continued)

OTHER PUBLICATIONS

English translation of DE 102008059964 (Year: 2010).*
(Continued)

*Primary Examiner* — Michael L Dignan
(74) *Attorney, Agent, or Firm* — Scully, Scott, Murphy & Presser, P.C.

(57) ABSTRACT

The present application provides a battery module, a battery pack and a vehicle, the battery module includes a battery and a frame assembly. The frame assembly includes two first splints, two second splints and a first strap. Each first splint includes a plurality of first connecting plates, and the plurality of first connecting plates are arranged side by side in a second direction. One of two adjacent first connecting plates is provided with a first positioning groove, and the other is provided with a first positioning protrusion, and the two adjacent first connecting plates are spliced and connected through a clearance fitting between the first positioning groove and the corresponding first positioning protrusion. This assembly method is simple and fast, which improves a grouping efficiency of the battery module.

18 Claims, 8 Drawing Sheets

(56) References Cited

FOREIGN PATENT DOCUMENTS

| | | | |
|---|---|---|---|
| CN | 204315644 U | | 5/2015 |
| CN | 205248386 U | | 5/2016 |
| CN | 20545240 | * | 8/2016 |
| CN | 205452404 U | | 8/2016 |
| CN | 206992168 U | | 2/2018 |
| CN | 207441760 U | | 6/2018 |
| CN | 207743294 | * | 8/2018 |
| CN | 207743294 U | | 8/2018 |
| CN | 208256788 | * | 12/2018 |
| CN | 208256788 U | | 12/2018 |
| CN | 210200839 U | | 3/2020 |
| CN | 210535723 U | | 5/2020 |
| DE | 102008059964 | * | 6/2010 |
| DE | 102008059966 A1 | | 6/2010 |
| DE | 102010050992 A1 | | 5/2012 |
| WO | WO 2005116369 | * | 12/2005 |
| WO | WO 2016/052899 | * | 4/2016 |

OTHER PUBLICATIONS

English translation of CN 205452404 (Year: 2016).*
English translation of CN208256788 (Year: 2018).*
Extended European Search Report dated May 9, 2022 received in European Patent Application No. EP 20864937.6.
International Search Report dated Oct. 28, 2020 issued in PCT/CN2020/104676.

* cited by examiner

BATTERY MODULE, BATTERY PACK AND VEHICLE

CROSS-REFERENCE TO RELATED APPLICATIONS

This application is a continuation of International Application No. PCT/CN2020/104676, filed on Jul. 25, 2020, which claims priority to Chinese Patent Application No. 201921576322.5, filed on Sep. 20, 2019, both of which are hereby incorporated by reference in their entireties.

TECHNICAL FIELD

The present application relates to the technical field of batteries, and in particular, relates to a battery module, a battery pack and a vehicle.

BACKGROUND

A battery module usually includes a plurality of batteries, two first splints and two second splints, where the two first splints and the two second splints are usually spliced and connected by a welding method and formed into a frame structure, and the frame structure accommodates and clamps the plurality of batteries.

At present, the frame structure formed by the above welding method has the following problems: (1) limited by a welding process, a grouping efficiency of the battery module is not high; (2) during use of the battery module, due to expansion and deformation generated by the battery to a certain extent, when an expansion force of a battery is large, it is easy to lead to a connection failure between the first splint and the second splint, thereby causing the battery module to fall apart; moreover, if the expansion and deformation of the battery are not released in time, a service life of the battery can be greatly reduced.

SUMMARY

In view of problems in the background art, a purpose of the present application is to provide a battery module, a battery pack, and a vehicle, which not only improves a grouping efficiency of the battery module, but also absorbs expansion and deformation generated by a battery, thereby ensuring a service life of the battery.

In order to implement the above purpose, the present application provides a battery module, which includes a plurality of batteries and a frame assembly for accommodating and clamping the plurality of batteries. The frame assembly includes two first splints, two second splints and a first strap. The two first splints are arranged at intervals in a first direction, the two second splints are arranged at intervals in a second direction, the two second splints are connected to the two first splints and together form an accommodating cavity for accommodating the plurality of batteries, and the first strap surrounds outside of the two first splints and the two second splints. Each first splint includes a plurality of first connecting plates, and the plurality of first connecting plates are arranged side by side in the second direction. In the second direction, one of two adjacent first connecting plates is provided with a first positioning groove, and the other is provided with a first positioning protrusion, and the two adjacent first connecting plates are spliced and connected through a clearance fitting between the first positioning groove and the corresponding first positioning protrusion.

In one embodiment according to the present application, the first positioning groove is formed as a circular groove or a rectangular groove; and accordingly, the first positioning protrusion is formed as a circular protrusion or a rectangular protrusion.

In one embodiment according to the present application, a side of each first connecting plate facing away from a battery is provided with a first accommodating groove, and the first accommodating groove accommodates a corresponding part of the first strap.

In one embodiment according to the present application, a side of each second splint facing away from the battery is provided with a second accommodating groove, and the second accommodating groove accommodates the corresponding part of the first strap.

In one embodiment according to the present application, one end of the first connecting plate adjacent to the second splint is provided with the first positioning protrusion, the end of the first connecting plate is close to the second splint, the second splint is provided with a fitting groove, and the fitting groove and the corresponding first positioning protrusion are fitted with each other to connect the second splint and the adjacent first connecting plate.

Or, in another embodiment according to the present application, one end of the first connecting plate adjacent to the second splint is provided with the first positioning groove, the end of the first connecting plate is close to the second splint, the second splint is provided with a fitting protrusion, and the fitting protrusion is and the corresponding first positioning groove are fitted with each other to connect the second splint and the adjacent first connecting plate.

In one embodiment according to the present application, a fitting manner between the fitting groove and the corresponding first positioning protrusion is a clearance fitting or an interference fitting.

Or, in another embodiment according to the present application, a fitting manner between the first positioning groove and the corresponding fitting protrusion is the clearance fitting or the interference fitting.

In one embodiment according to the present application, each second splint includes a plurality of second connecting plates, and the plurality of second connecting plates are arranged side by side in the first direction. In the first direction, one of two adjacent second connecting plates is provided with a second positioning groove, and the other is provided with a second positioning protrusion, and the two adjacent second connecting plates are spliced and connected through a clearance fitting between the second positioning groove and the corresponding second positioning protrusion.

In one embodiment according to the present application, the plurality of batteries are arranged in a battery row in sequence along a thickness direction of the battery. The two first splints are located at both ends of the battery row in the first direction, and the two second splints are located at both ends of the battery row in the second direction.

In another embodiment according to the present application, the plurality of batteries are arranged in a plurality of battery rows. The frame assembly further includes a plurality of second straps, each second strap surrounds two oppositely arranged first connecting plates, the second strap divides the accommodating cavity into a plurality of sub-chambers, and each sub-chamber accommodates the corresponding battery row.

In one embodiment according to the present application, the plurality of battery rows are arranged side by side in the second direction, and the plurality of batteries in each battery row are arranged in sequence along the first direction.

Or, in another embodiment according to the present application, the plurality of battery rows are arranged in sequence in the second direction, and the plurality of batteries in each battery row are arranged in sequence along the second direction.

In one embodiment according to the present application, the plurality of first connecting plates of each first splint includes a start connecting plate, a middle connecting plate and an end connecting plate, a second strap surrounding two oppositely arranged start connecting plates and the second strap surrounding two oppositely arranged middle connecting plates are arranged in a misalignment manner in a third direction, and/or the second strap surrounding two oppositely arranged end connecting plates and the second strap surrounding two oppositely arranged middle connecting plates are arranged in the misalignment manner in the third direction.

In another aspect, the present application further provides a battery pack, which includes the above battery module.

In addition, the present application further provides a vehicle, which includes the above battery pack for supplying electric energy to the vehicle.

The technical solution of the present application has the following beneficial effects:

In a grouping process of the battery module, firstly the plurality of first connecting plates of each first splint can be quickly positioned through the first positioning groove and the corresponding first positioning protrusion, then in the second direction, the oppositely arranged first positioning protrusion is inserted into the corresponding first positioning groove, so that the plurality of first connecting plates are spliced together to form the first splint. This assembly method of the battery module is simple and fast, which improves a grouping efficiency of the battery module. At the same time, the first positioning protrusion and the corresponding first positioning groove that are oppositely arranged are in a clearance fitting, so the first positioning protrusion can freely expand and contract in the corresponding first positioning groove. Therefore, when the battery in the battery module expands and deforms, the first positioning protrusion can move relative to the corresponding first positioning groove under an action of an expansion force, so that a certain interval is generated between the two adjacent first connecting plates, and the interval can absorb expansion and deformation generated by the battery in time, thereby ensuring a service life of the battery. In addition, the first positioning protrusion and the corresponding first positioning groove that are oppositely arranged are in the clearance fitting, so a large part of the expansion force generated by the battery can act on the first strap, thereby weakening a damage of the expansion force to structure of the first splint and the second splint.

Figure 1:
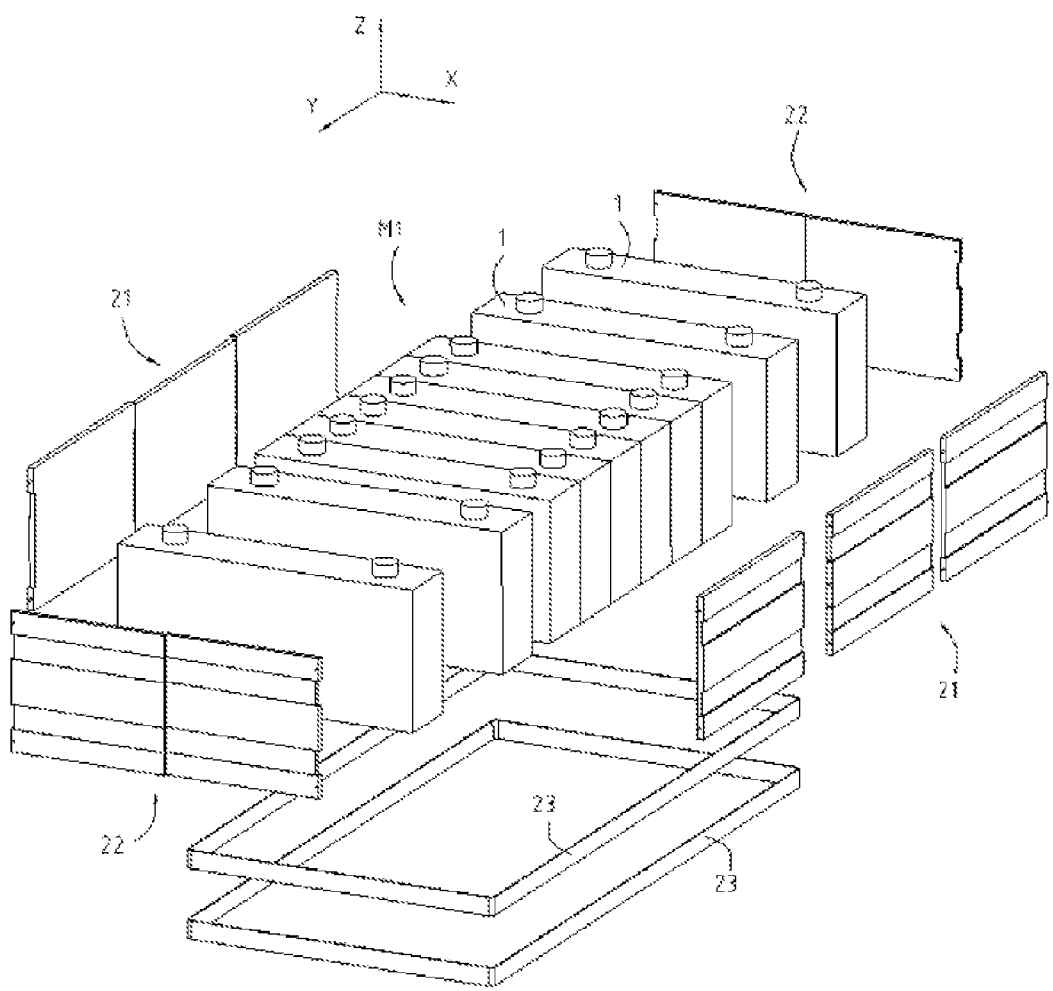
FIG. 1 is an exploded view of a battery module of the present application in one embodiment.

Reference signs are explained as follows:
1 battery
   M1 battery row
2 frame assembly
   21 first splint
      211 first connecting plate
         221A start connecting plate
         211B middle connecting plate
         211C end connecting plate
      F11 first positioning groove
      F12 first positioning protrusion
      F13 first accommodating groove
   22 second splint
      221 second connecting plate
      F21 second positioning groove
      F22 second positioning protrusion
      F23 second accommodating groove
      F24 fitting groove
   23 first strap
   24 second strap
S accommodating cavity
   S1 sub-chamber
X first direction
Y second direction
Z third direction

DESCRIPTION OF EMBODIMENTS

To make the objectives, technical solutions, and advantages of the present application clearer and more comprehensible, the present application will be further described below in detail with reference to the accompanying drawings and embodiments. It should be understood that the specific embodiments described herein are merely used to explain the present application, but are not intended to limit the present application.

In the description of the present application, unless otherwise specified and limited explicitly, the terms "first", "second" and "third" and so on are merely intended for a purpose of description, and shall not be understood as an indication or implication of relative importance. The term "a plurality of" refers to more than two (including two). Unless otherwise specified or illustrated, the term "connection" and "fixation" should be understood broadly, for example, the "connection" may either be a fixed connection, or a detachable connection, or an integrated connection, or an electrical connection, or a signal connection; and the "connection" may either be a direct connection, or an indirect connection through an intermediary. Those of ordinary skill in the art can appreciate the specific meanings of the foregoing terms in the present application according to specific conditions.

In the description of the specification, it should be understood that the terms representing directions such as "up" and "down" described in the embodiments of the present application are described from the angles shown in the accompanying drawings, and should not be understood as limitation on the embodiments of the present application. The present application will be further described below in detail through the specific embodiments with reference to the accompanying drawings.

A vehicle of the present application includes a vehicle body, a battery pack and a power source. Both the battery pack and the power source are installed on the vehicle body, and the battery pack is electrically connected to the power source to supply power to the power source, where a vehicle may be a new energy automobile. In an implementation manner, the new energy automobile may be a pure electric automobile, a hybrid automobile or an extended-range automobile. In some embodiments, the battery pack may be horizontally arranged at a bottom of the vehicle body.

The battery pack includes a box body and the battery module. The number of a battery module 1 can be one or more, and each battery module 1 can be fixed to the box body by a corresponding fastener (such as a bolt), or each battery module 1 can be fixed to the box body by a bonding method.

Referring to FIGS. 1 to 12, a battery module includes a plurality of batteries 1 and a frame assembly 2 for accommodating and clamping the plurality of batteries 1.

In an implementation manner, the frame assembly 2 can include two first splints 21, two second splints 22 and a first strap 23, and the battery module can also include a second strap 24 according to an actual condition.

Referring to FIGS. 2, 3, 6 and 12, the two first splints 21 of the frame assembly 2 are arranged at intervals in a first direction X, the two second splints 22 are arranged at intervals in a second direction Y, the two second splints 22 are connected to the two first splints 22 and together form an accommodating cavity S for accommodating the plurality of batteries 1. The first strap 23 surrounds outside of the two first splints 21 and the two second splints 22, in order to clamp the plurality of batteries 1 in the accommodating cavity S.

Referring to FIGS. 1 to 4, 6, 7 and 12, each first splint 21 includes a plurality of first connecting plates 211, and the plurality of first connecting plates 211 are arranged side by side in the second direction Y. Among them, in the second direction Y, one of two adjacent first connecting plates 211 is provided with a first positioning groove F11, and the other is provided with a first positioning protrusion F12, and the two adjacent first connecting plates 211 are spliced and connected through a clearance fitting between the first positioning groove F11 and the corresponding first positioning protrusion F12. In other words, each first splint 21 is spliced and formed in sequence by the plurality of first connecting plates 211 in the second direction Y.

In a grouping process of the battery module, firstly the plurality of first connecting plates 211 of each first splint 21 can be quickly positioned through the first positioning groove F11 and the corresponding first positioning protrusion F12, then in the second direction Y, the oppositely arranged first positioning protrusion F12 is inserted into the corresponding first positioning groove F11, so that the plurality of first connecting plates 211 are spliced together to form the first splint 21. This assembly method of the battery module is simple and fast, and a size range of the frame assembly 2 can be flexibly designed, which improves a grouping efficiency of the battery module. At the same time, the first positioning protrusion F12 and the corresponding first positioning groove F11 that are oppositely arranged are in a clearance fitting, so the first positioning protrusion F12 can freely expand and contract in the corresponding first positioning grooves F11. Therefore, when a battery 1 in the battery module expands and deforms, the first positioning protrusion F12 can move relative to the corresponding first positioning groove F11 under an action of an expansion force, so that a certain interval is generated between the two adjacent first connecting plates 211, and the interval can absorb expansion and deformation generated by the battery 1 in time, thereby ensuring a service life of the battery 1. In addition, the first positioning protrusion F12 and the corresponding first positioning groove F11 that are oppositely arranged are in the clearance fitting, so a large part of the expansion force generated by the battery 1 can act on the first strap 23, thereby weakening a damage of the expansion force to structure of the first splint 21 and the second splint 22.

Figure 2:
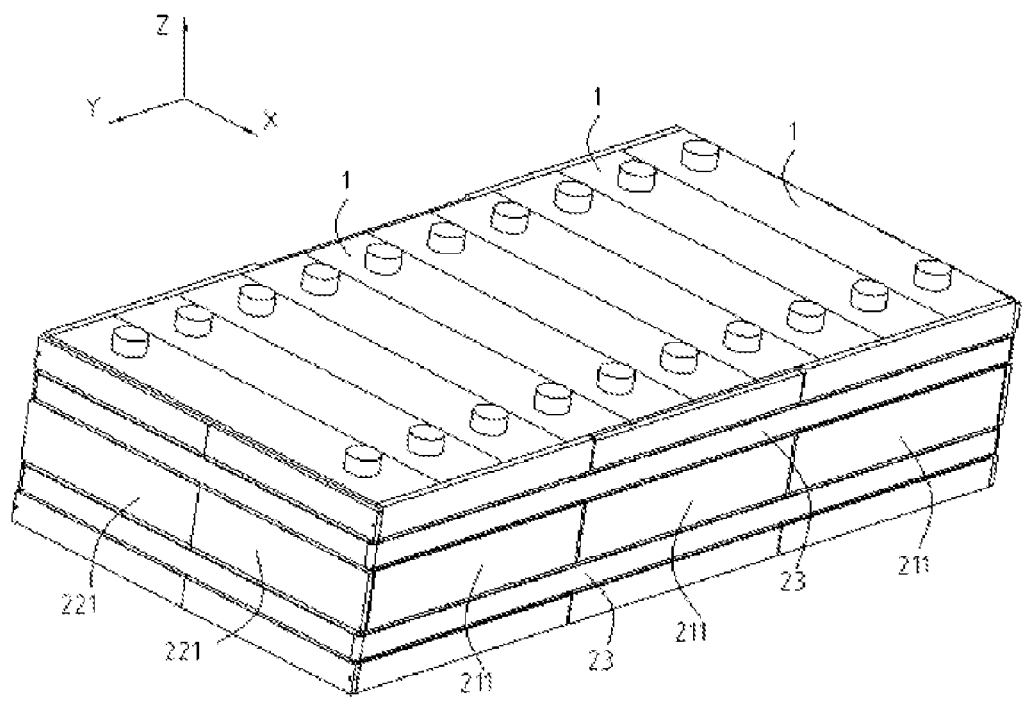
FIG. 2 is an assembled perspective view of FIG. 1.
Figure 3:
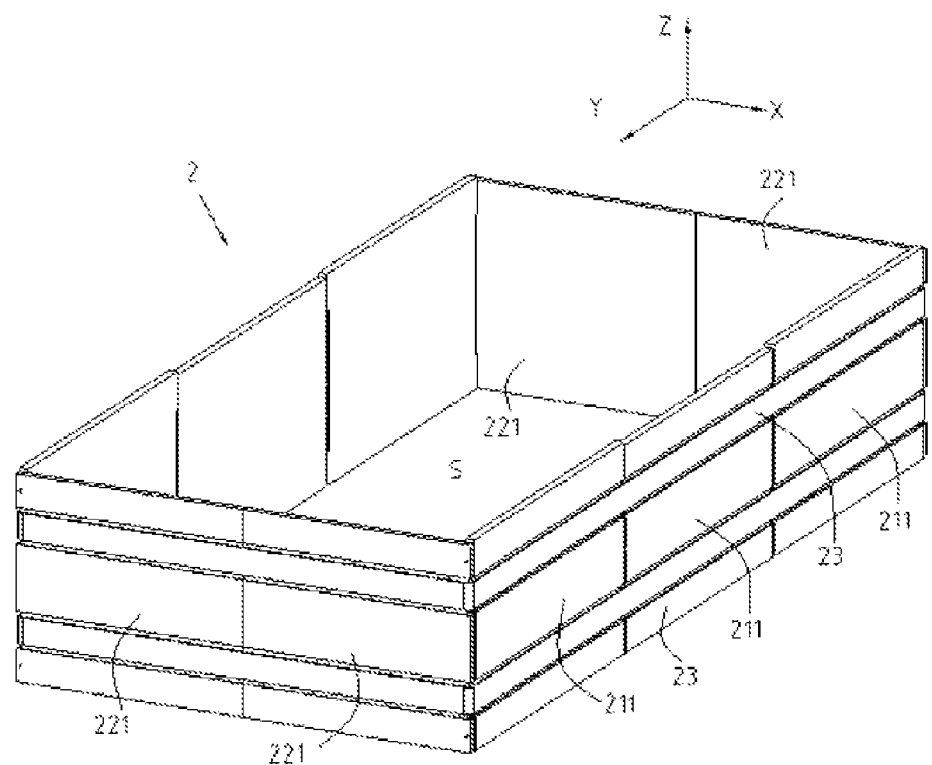
FIG. 3 is a perspective view of a battery module in FIG. 2.
Figure 4:
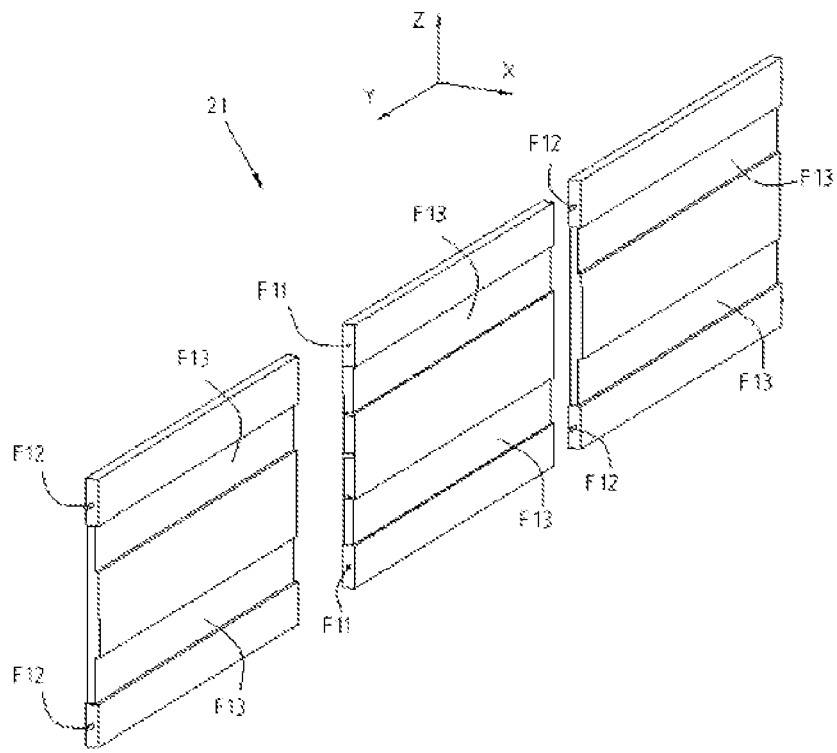
FIG. 4 is an exploded view of a first splint in FIG. 3.

Referring to FIGS. 2 to 4, the first positioning groove F11 of the first connecting plate 211 can be formed as a circular groove, and accordingly, the first positioning protrusion F12 corresponding to the first positioning groove F11 can be formed as a circular protrusion. Referring to FIGS. 6 to 10, the first positioning groove F11 of the first connecting plate 211 can be formed as a rectangular groove, and accordingly, the first positioning protrusion F12 corresponding to the first positioning groove F11 can be formed as a rectangular protrusion.

Referring to FIGS. 1 to 4, a side of each first connecting plate 211 facing away from the battery 1 is provided with a first accommodating groove F13, and the first accommodating groove F13 accommodates a corresponding part of the first strap 23. Here, the first accommodating groove F13 can not only provide a guidance for installation of the first strap 23, but also prevent the first strap 23 from shifting during use, which improves a fixing reliability of the first strap 23.

Referring to FIGS. 1 to 4, 6, 11 and 12, one end of the first connecting plate 211 adjacent to the second splint 22 can be provided with the first positioning protrusion F12, the end of the first connecting plate 211 is close to the second splint 22. The second splint 22 is provided with a fitting groove F24, and the fitting groove F24 and the corresponding first positioning protrusion F12 are fitted with each other to connect the second splint 22 and its adjacent first connecting plate 211. In an implementation manner, the fitting groove F24 of the second splint 22 can be formed as a circular groove or a rectangular groove, and accordingly, the first positioning protrusion F12 corresponding to the fitting groove F24 can be formed as a circular protrusion or a rectangular protrusion.

In an embodiment, a fitting manner between the fitting groove F24 and the corresponding first positioning protrusion F12 can be an interference fitting. The interference fitting is a tight fitting, so that a connecting reliability between the second splint 22 and the adjacent first connecting plate 211 can be ensured, which improves a structural strength of the frame assembly 2.

In another embodiment, a fitting manner between the coordinating groove F24 and the corresponding first positioning protrusion F12 is a clearance fitting. The clearance fitting is a loose fitting, so when the battery 1 in the battery module expands and deforms, the corresponding first positioning protrusion F12 can move relative to the fitting groove F24 under the action of the expansion force, so that the certain interval is generated between the second splint 22 and its adjacent first connecting plate 211, and the interval can absorb the expansion and the deformation generated by the battery 1 in time, thereby further ensuring the service life of the battery 1.

Alternatively, one end of the first connecting plate 211 adjacent to the second splint 22 is provided with the first positioning groove F11, the end of the first connecting plate 211 is close to the second splint 22. The second clamp plate 22 is provided with a fitting protrusion, and the fitting protrusion and the corresponding first positioning groove F11 are fitted with each other to connect the second splint 22 and the adjacent first connecting plate 211. In an implementation manner, a fitting manner between the first positioning groove F11 and the corresponding fitting protrusion may be a clearance fitting or an interference fitting.

Referring to FIGS. 6, 7, 11 and 12, each second splint 22 can be a whole independent plate-like structure. At this time, both ends of each second splint 22 in the first direction X are connected to the corresponding first connecting 211, respectively, Referring to FIGS. 1 to 3, and 5, each second splint 22 can include a plurality of second connecting plates 221, and the plurality of second connecting plates 221 are arranged side by side in the first direction X. Among them, in the first direction X, one of two adjacent second connecting plates 221 is provided with a second positioning groove F21, and the other is provided with a second positioning protrusion F22, and the two adjacent second connecting plates 221 are spliced and connected through a clearance fitting between the second positioning groove F21 and the corresponding second positioning protrusion F22. In other words, each second plate 22 is spliced and formed in sequence by the plurality of second connecting plates 221 in the first direction X.

In a grouping process of the battery module, firstly the plurality of second connecting plates 221 of each second splint 22 can be quickly positioned through the second positioning groove F21 and the corresponding second positioning protrusion F22, then in the first direction X, the oppositely arranged second positioning protrusion F22 is inserted into the corresponding second positioning groove F21, so that the plurality of second connecting plates 221 are spliced together to form the second splint 22. The second positioning protrusion F22 and the corresponding second positioning groove F21 that are oppositely arranged are in the clearance fitting, so the second positioning protrusion F22 can freely expand and contract in the corresponding second positioning groove F21. Therefore, the frame assembly 2 formed by the second splint 22 and the first splint 21 of such structure can not only absorb the expansion and the deformation generated by the battery 1, but also adapt to different types of the battery 1, which not only expands a use range of the frame assembly 2, but also reduces types and the number of the second splint 22, thereby greatly reducing costs.

Figure 5:
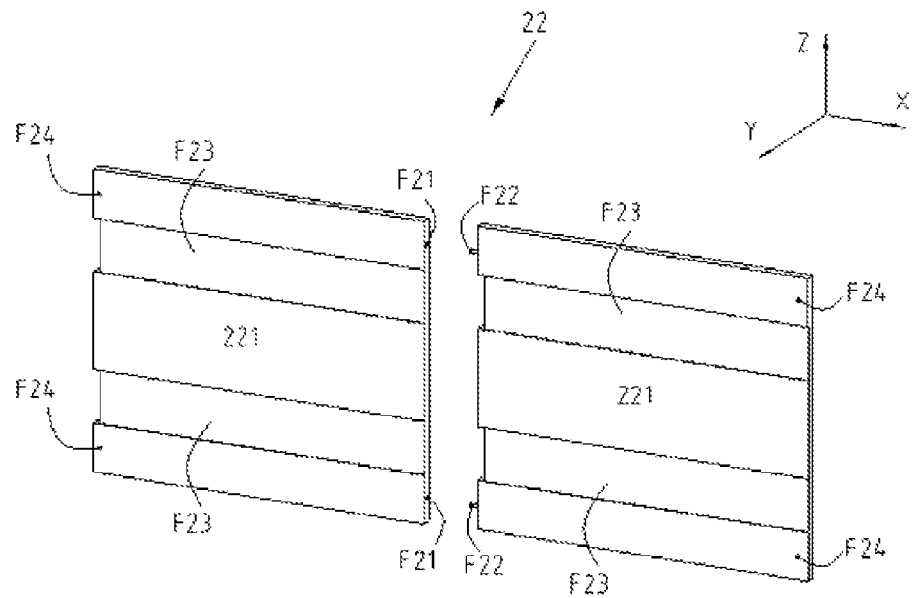
FIG. 5 is an exploded view of a second splint in FIG. 3.
Figure 6:
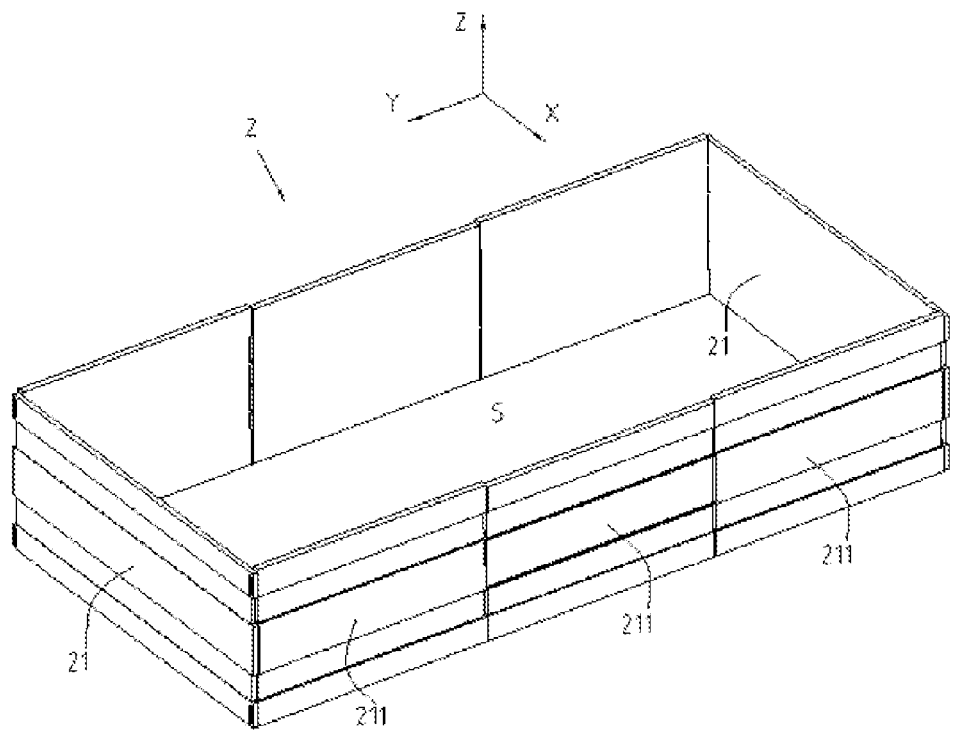
FIG. 6 is a modified example of FIG. 4.
Figure 7:
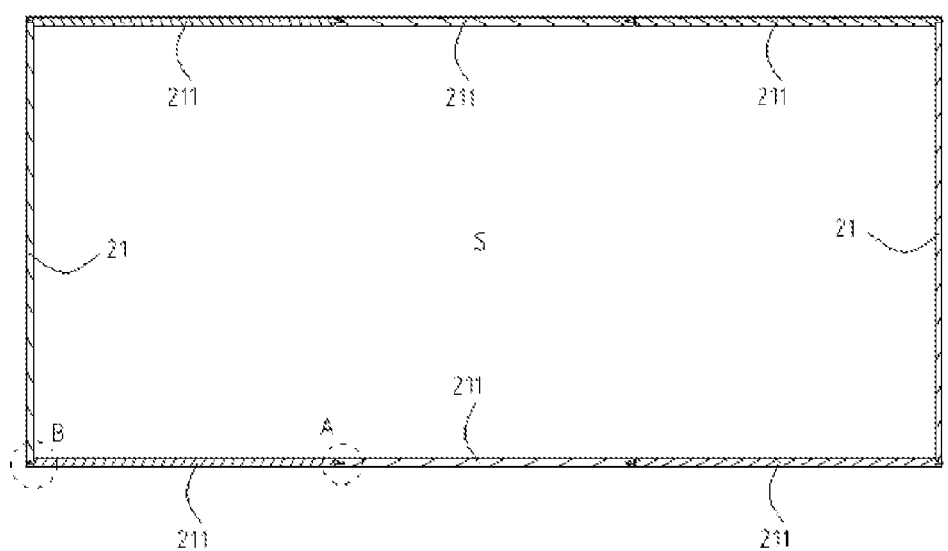
FIG. 7 is a schematic diagram of a connection between two adjacent first connecting plates of a first splint in FIG. 6.
Figure 8:
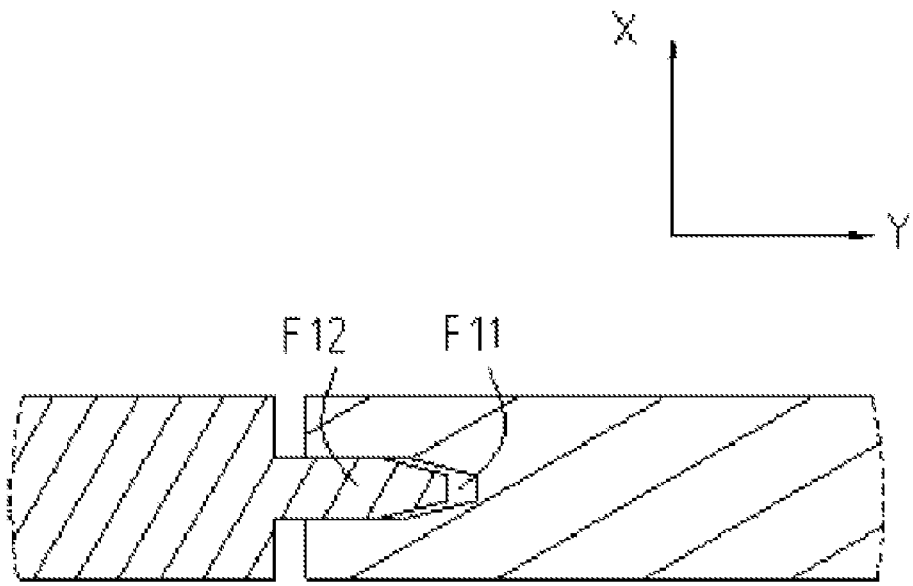
FIG. 8 is an enlarged view of a circle A portion in FIG. 7.
Figure 9:
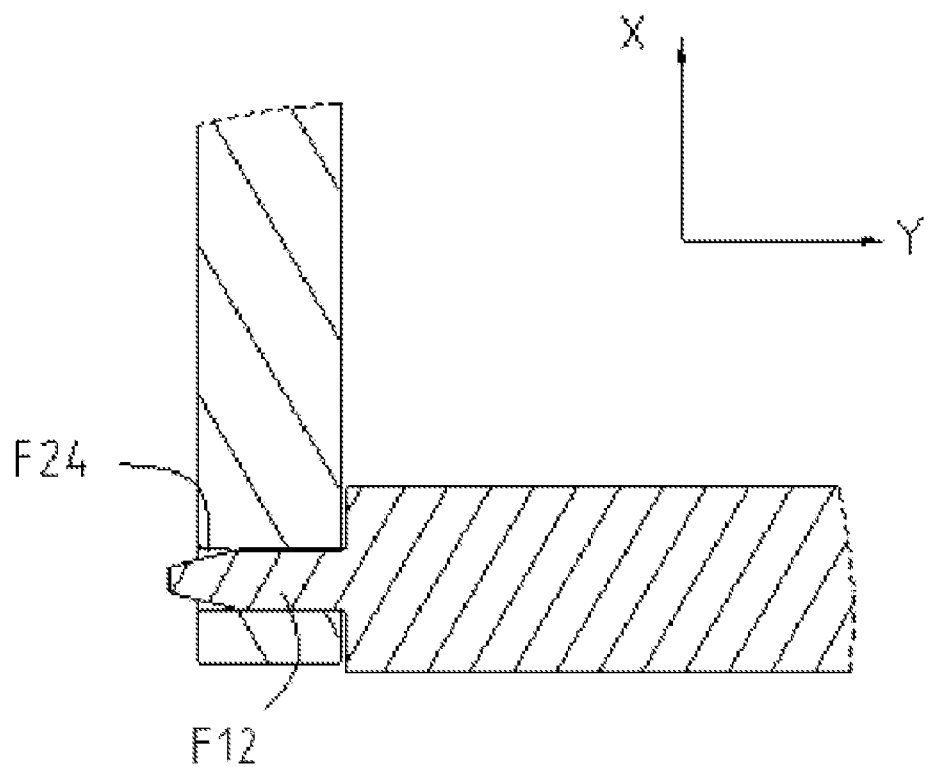
FIG. 9 is an enlarged view of a circle B portion in FIG. 7.
Figure 10:
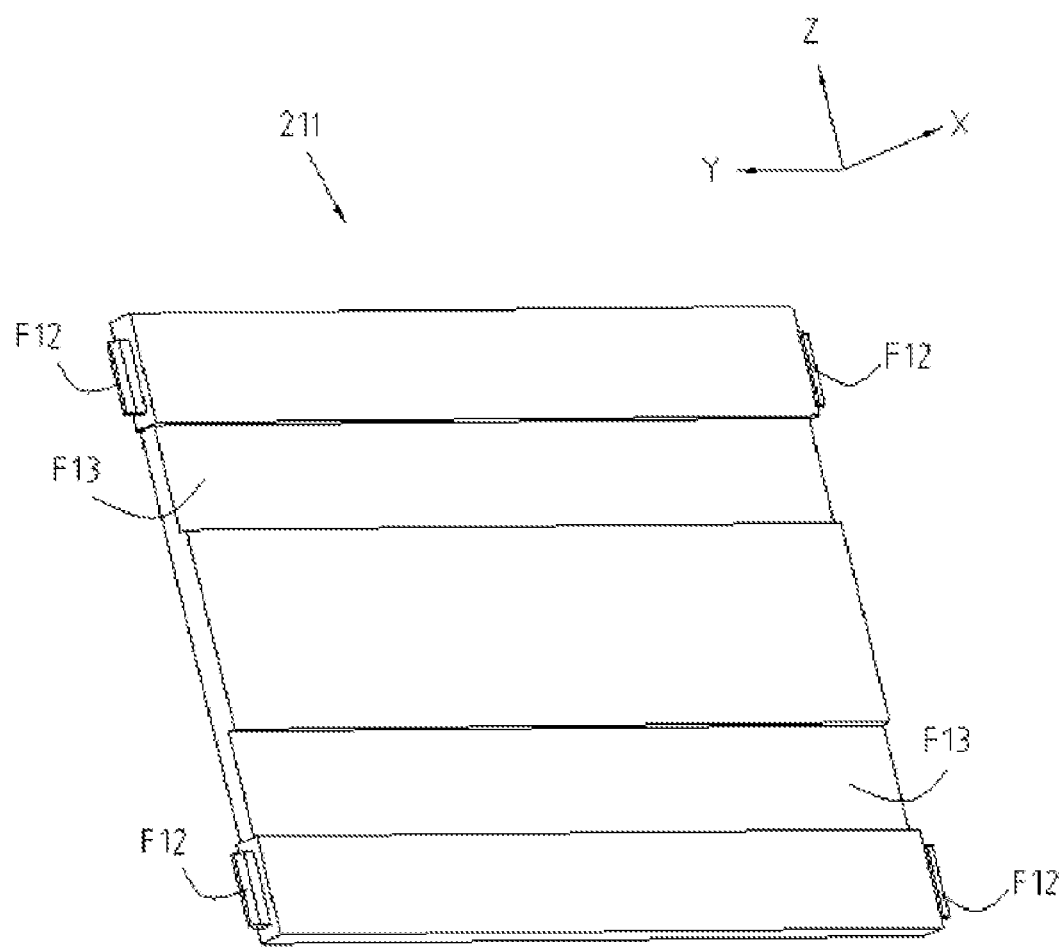
FIG. 10 is a perspective view of one of first connecting plates in FIG. 6.
Figure 11:
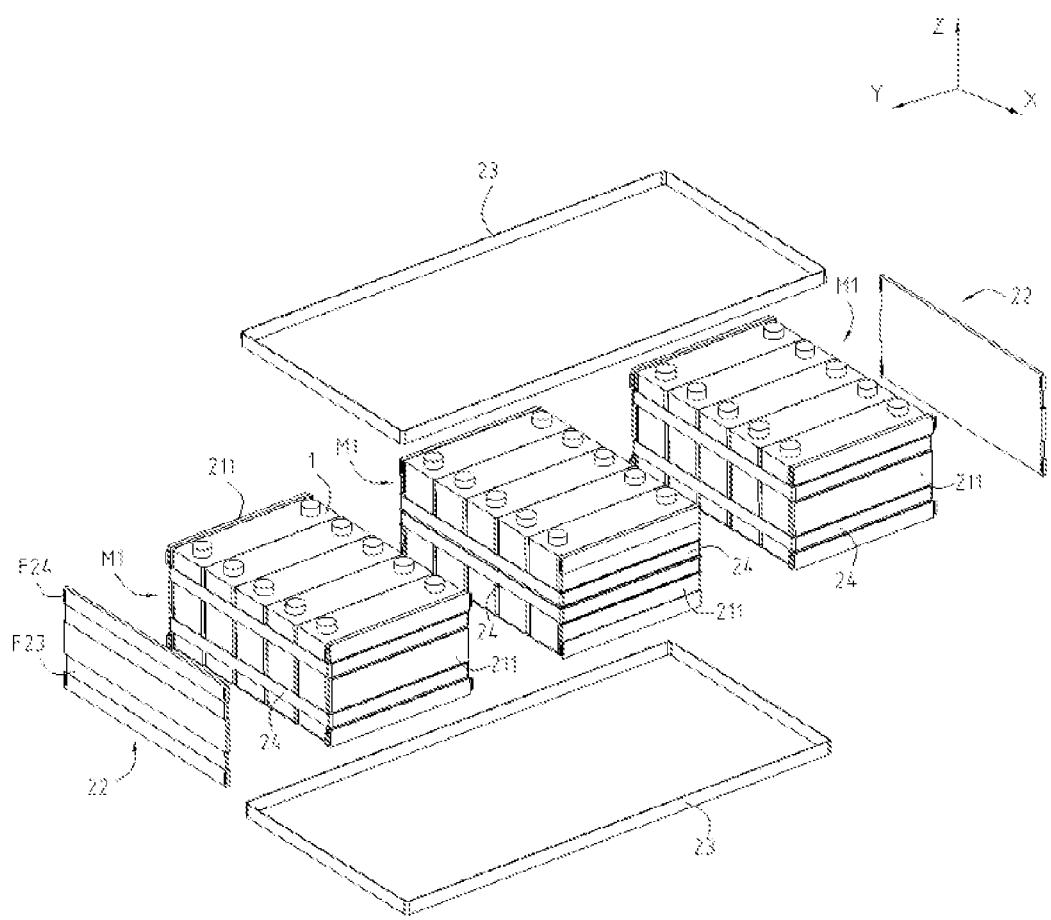
FIG. 11 is an exploded view of a battery module of the present application in another embodiment.

Referring to FIGS. 5 and 11, a side of each second splint 22 facing away from the battery 1 can be provided with a second accommodating groove F23, and the second accommodating groove F23 accommodates the corresponding part of the first strap 23. Here, the second accommodating groove F23 can not only provide a guidance for the installation of the first strap 23, but also prevent the first strap 23 from shifting during the use, which improves the fixing reliability of the first strap 23.

The number of the first strap 23 can be one or more. When there a plurality of first straps 23, the plurality of first straps 23 are arranged at intervals in a third direction Z.

Referring to FIGS. 1 and 2, when the number of the batteries 1 is relatively small, the plurality of batteries 1 are arranged in a battery row M1 in sequence along a thickness direction of the battery 1. At this time, the two first splints 21 are located at both ends of the battery row M1 in the first direction X, and the two second splints 22 are located at both ends of the battery row M1 in the second direction Y. The first strap 23 surrounds outside of the two first splints 21 and the two second splints 22 to clamp the battery row M1. In an implementation manner, when the plurality of batteries 1 are arranged in the battery row M1 in sequence along the thickness direction of the battery 1, the thickness direction of the battery 1 can be parallel to the second direction Y, that is, a large face of each battery 1 faces the second clamping 22. Of course, the thickness direction of the battery 1 can also be parallel to the first direction X, that is, the large face of each battery faces the first splint 21.

When the number of the batteries 1 is relatively large, in order to improve structural rigidity and grouping efficiency of the battery module itself, the plurality of batteries 1 can be arranged in a plurality of battery rows M1, each battery row M1 is arranged between two oppositely arranged first connecting plates 211 and is fastened by a corresponding second strap 24. And the plurality of battery rows M1 are fastened by the first strap 23 at the same time. In an implementation manner, the plurality of battery rows M1 can arranged side by side in the second direction Y, and a plurality of batteries 1 in each battery row M1 are arranged in sequence along the first direction X (that is, the thickness direction of the battery 1 is parallel to the first direction X), as shown in FIG. 11. Or, the plurality of battery rows M1 are arranged in sequence in the second direction Y (that is, the plurality of battery rows M1 are arranged in a long row in the second direction Y at this time), and the plurality of batteries 1 in each battery row M1 are arranged in sequence along the second direction Y (at this time, the thickness direction of the battery 1 is parallel to the second direction Y).

Figure 12:
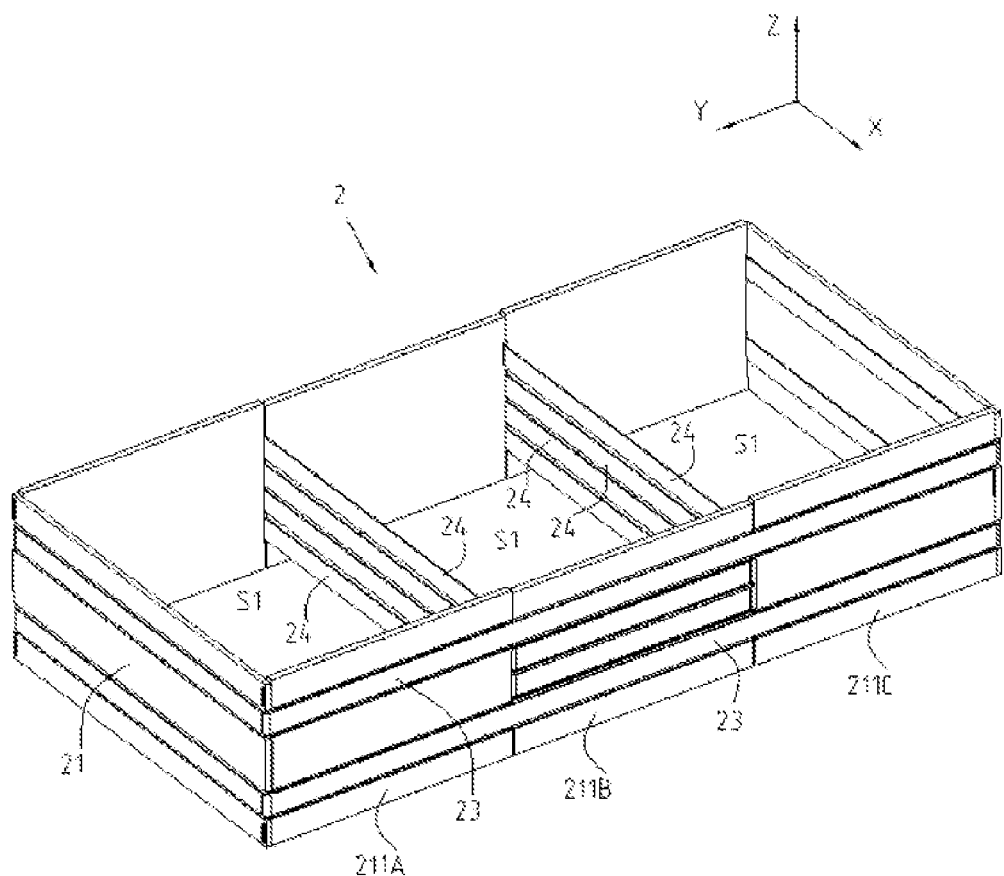
FIG. 12 is a perspective view of a frame assembly of a battery module in FIG. 11.

Referring to FIG. 12, the second strap 24 surrounds two oppositely arranged first connecting plates 211 in the first direction X, and at this time, the second strap 24 divides the accommodating cavity S into a plurality of sub-chambers S1, and each sub-chamber S1 accommodates a corresponding battery row M1.

Furthermore, referring to FIG. 12, the number of the first connecting plates 211 of each first splint 21 can be three, and the three first connecting plates 211 are a start connecting plate 211A, a middle connecting plate 211B and an end connecting plate 211C in sequence. Among them, a second strap 23 surrounding two oppositely arranged start connecting plates 211A and the second strap 23 surrounding two oppositely arranged middle connecting plates 211B are arranged in a misalignment manner in a third direction Z. And/or, the second strap 23 surrounding two oppositely arranged end connecting plates 211C and the second strap 23 surrounding two oppositely arranged middle connecting plates 211B are arranged in the misalignment manner in the third direction Z. In other words, two adjacent second straps 24 in the second direction Y are arranged in the misalignment manner in the third direction Z.

Here, the two adjacent second straps 24 in the second direction Y adopt this misaligning arrangement, which not only improves a space utilization of the battery module, but also avoids the wear or even fracture failure caused by overlapping of the two adjacent second straps 24, thereby increasing a service life of the second strap 24.

What is claimed is:

1. A battery module, comprising a plurality of batteries and a frame assembly;
   the frame assembly comprises two first splints, two second splints and a first strap;

the two first splints are arranged at intervals in a first direction, the two second splints are arranged at intervals in a second direction, the two second splints are connected to the two first splints and together form an accommodating cavity accommodating the plurality of batteries, and the first strap both surrounds and is outside of the two first splints and the two second splints;

each first splint comprises a plurality of first connecting plates, and the plurality of first connecting plates are arranged side by side in the second direction; and in the second direction, one of two adjacent first connecting plates is provided with a first positioning groove, and the other is provided with a first positioning protrusion, and the two adjacent first connecting plates are spliced and connected through a clearance fitting between the first positioning groove and the corresponding first positioning protrusion;

wherein the plurality of batteries are arranged in a plurality of battery rows;

the frame assembly further comprises a plurality of second straps, each second strap surrounds two oppositely arranged first connecting plates, and the second strap divides the accommodating cavity into a plurality of sub-chambers, and each sub-chamber accommodates the corresponding battery row.

2. The battery module according to claim 1, wherein the first positioning groove is formed as a circular groove or a rectangular groove; and accordingly, the first positioning protrusion is formed as a circular protrusion or a rectangular protrusion.

3. The battery module according to claim 1, wherein a side of each first connecting plate facing away from a battery is provided with a first accommodating groove, and the first accommodating groove accommodates a corresponding part of the first strap;

and/or a side of each second splint facing away from the battery is provided with a second accommodating groove, and the second accommodating groove accommodates the corresponding part of the first strap.

4. The battery module according to claim 1, wherein one end of the first connecting plate adjacent to the second splint is provided with the first positioning protrusion, the end of the first connecting plate is close to the second splint, the second splint is provided with a fitting groove, and the fitting groove and the corresponding first positioning protrusion are fitted with each other to connect the second splint and the adjacent first connecting plate; or one end of the first connecting plate adjacent to the second splint is provided with the first positioning groove, the end of the first connecting plate is close to the second splint, the second splint is provided with a fitting protrusion, and the fitting protrusion and the corresponding first positioning groove are fitted with each other to connect the second splint and the adjacent first connecting plate.

5. The battery module according to claim 4, wherein a fitting manner between the fitting groove and the corresponding first positioning protrusion is a clearance fitting or an interference fitting; or a fitting manner between the fitting protrusion and the corresponding first positioning groove is the clearance fitting or the interference fitting.

6. The battery module according to claim 1, wherein each second splint comprises a plurality of second connecting plates, and the plurality of second connecting plates are arranged side by side in the first direction; and in the first direction, one of two adjacent second connecting plates is provided with a second positioning groove, and the other is provided with a second positioning protrusion, and the two adjacent second connecting plates are spliced and connected through a clearance fitting between the second positioning groove and the corresponding second positioning protrusion.

7. The battery module according to claim 1, wherein the plurality of batteries are arranged in a battery row in sequence along a thickness direction of a battery;

the two first splints are located at both ends of the battery row in the first direction, respectively, and the two second splints are located at both ends of the battery row in the second direction, respectively.

8. The battery module according to claim 1, wherein the plurality of battery rows are arranged side by side in the second direction, and a plurality of the batteries in each battery row are arranged in sequence along the first direction;

or the plurality of battery rows are arranged in sequence in the second direction, and the plurality of the batteries in each battery row are arranged in sequence along the second direction.

9. The battery module according to claim 1, wherein the plurality of first connecting plates of each first splint comprises a start connecting plate, a middle connecting plate and an end connecting plate;

the second strap surrounding two oppositely arranged start connecting plates and the second strap surrounding two oppositely arranged middle connecting plates are arranged in a misalignment manner in a third direction; and/or the second strap surrounding two oppositely arranged end connecting plates and the second strap surrounding two oppositely arranged middle connecting plates are arranged in the misalignment manner in the third direction.

10. A battery pack, comprising a box body and at least one of battery modules, wherein a battery module comprises a plurality of batteries and a frame assembly;

the frame assembly comprises two first splints, two second splints and a first strap;

the two first splints are arranged at intervals in a first direction, the two second splints are arranged at intervals in a second direction, the two second splints are connected to the two first splints and together form an accommodating cavity for accommodating the plurality of batteries, and the first strap both surrounds and is outside of the two first splints and the two second splints;

each first splint comprises a plurality of first connecting plates, and the plurality of first connecting plates are arranged side by side in the second direction; and in the second direction, one of two adjacent first connecting plates is provided with a first positioning groove, and the other is provided with a first positioning protrusion, and the two adjacent first connecting plates are spliced and connected through a clearance fitting between the first positioning groove and the corresponding first positioning protrusion;

wherein the plurality of batteries are arranged in a plurality of battery rows;

the frame assembly further comprises a plurality of second straps, each second strap surrounds two oppositely arranged first connecting plates, and the second strap divides the accommodating cavity into a plurality of sub-chambers, and each sub-chamber accommodates the corresponding battery row.

11. The battery pack according to claim 10, wherein the first positioning groove is formed as a circular groove or a rectangular groove; and accordingly, the first positioning protrusion is formed as a circular protrusion or a rectangular protrusion.

12. The battery pack according to claim 10, wherein a side of each first connecting plate facing away from a battery is provided with a first accommodating groove, and the first accommodating groove accommodates a corresponding part of the first strap;

and/or a side of each second splint facing away from the battery is provided with a second accommodating groove, and the second accommodating groove accommodates the corresponding part of the first strap.

13. The battery pack according to claim 10, wherein one end of the first connecting plate adjacent to the second splint is provided with the first positioning protrusion, the end of the first connecting plate is close to the second splint, the second splint is provided with a fitting groove, and the fitting groove and the corresponding first positioning protrusion are fitted with each other to connect the second splint and the adjacent first connecting plate; or one end of the first connecting plate adjacent to the second splint is provided with the first positioning groove, the end of the first connecting plate is close to the second splint, the second splint is provided with a fitting protrusion, and the fitting protrusion and the corresponding first positioning groove are fitted with each other to connect the second splint and the adjacent first connecting plate.

14. The battery pack according to claim 13, wherein a fitting manner between the fitting groove and the corresponding first positioning protrusion is a clearance fitting or an interference fitting; or a fitting manner between the fitting protrusion and the corresponding first positioning groove is the clearance fitting or the interference fitting.

15. The battery pack according to claim 10, wherein each second splint comprises a plurality of second connecting plates, and the plurality of second connecting plates are arranged side by side in the first direction; and in the first direction, one of two adjacent second connecting plates is provided with a second positioning groove, and the other is provided with a second positioning protrusion, and the two adjacent second connecting plates are spliced and connected through a clearance fitting between the second positioning groove and the corresponding second positioning protrusion.

16. The battery pack according to claim 10, wherein the plurality of batteries are arranged in a battery row in sequence along a thickness direction of a battery;

the two first splints are located at both ends of the battery row in the first direction, respectively, and the two second splints are located at both ends of the battery row in the second direction, respectively.

17. The battery pack according to claim 10, wherein the plurality of battery rows are arranged side by side in the second direction, and a plurality of the batteries in each battery row are arranged in sequence along the first direction;

or the plurality of battery rows are arranged in sequence in the second direction, and the plurality of the batteries in each battery row are arranged in sequence along the second direction.

18. A vehicle, comprising a battery pack, wherein the battery pack is configured to supply electric energy to the vehicle;

the battery pack comprises a box body and at least one of battery modules;

a battery module comprises a plurality of batteries and a frame assembly;

the frame assembly comprises two first splints, two second splints and a first strap;

the two first splints are arranged at intervals in a first direction, the two second splints are arranged at intervals in a second direction, the two second splints are connected to the two first splints and together form an accommodating cavity for accommodating the plurality of batteries, and the first strap both surrounds and is outside of the two first splints and the two second splints;

each first splint comprises a plurality of first connecting plates, and the plurality of first connecting plates are arranged side by side in the second direction; and in the second direction, one of two adjacent first connecting plates is provided with a first positioning groove, and the other is provided with a first positioning protrusion, and the two adjacent first connecting plates are spliced and connected through a clearance fitting between the first positioning groove and the corresponding first positioning protrusion;

wherein the plurality of batteries are arranged in a plurality of battery rows;

the frame assembly further comprises a plurality of second straps, each second strap surrounds two oppositely arranged first connecting plates, and the second strap divides the accommodating cavity into a plurality of sub-chambers, and each sub-chamber accommodates the corresponding battery row.

* * * * *